United States Patent
Bauer et al.

(10) Patent No.: US 7,004,437 B2
(45) Date of Patent: Feb. 28, 2006

(54) SWIVEL ARM OF A CEILING-MOUNTED STAND

(75) Inventors: Georg Bauer, Dachau (DE); Willibald Hiemer, München (DE)

(73) Assignee: Trumpf Kreuzer Medizin Systeme GmbH & Co. KG, Puchheim (DE)

( * ) Notice: Subject to any disclaimer, the term of this patent is extended or adjusted under 35 U.S.C. 154(b) by 0 days.

(21) Appl. No.: 10/834,960

(22) Filed: Apr. 29, 2004

(65) Prior Publication Data

US 2004/0217245 A1 Nov. 4, 2004

(30) Foreign Application Priority Data

Apr. 29, 2003 (EP) .................................. 03009640

(51) Int. Cl.
  *E04G 3/00* (2006.01)
(52) U.S. Cl. .................................... 248/282.1; 248/323
(58) Field of Classification Search ............. 108/50.02;
    312/223.6; 248/282.1, 323, 324, 122.1, 123.11,
              248/289.11, 125.7, 333, 297.21, 125.9
  See application file for complete search history.

(56) References Cited

U.S. PATENT DOCUMENTS

| 1,551,332 | A | | 8/1925 | Schramm ..................... 285/181 |
| 1,855,751 | A | * | 4/1932 | Buchanan .............. 248/231.21 |
| 3,228,646 | A | * | 1/1966 | Lane et al. .............. 248/354.3 |
| 4,997,155 | A | * | 3/1991 | Reuter et al. ............ 248/278.1 |
| 5,118,066 | A | * | 6/1992 | Perrault et al. ............. 248/333 |
| 5,655,814 | A | * | 8/1997 | Gibbs ..................... 297/411.38 |
| 6,027,090 | A | * | 2/2000 | Liu ....................... 248/281.11 |
| 6,095,468 | A | | 8/2000 | Chirico et al. ........... 248/282.1 |

FOREIGN PATENT DOCUMENTS

| DE | 295 15 709 | 11/1995 |
| EP | 0 614 035 | 3/1994 |
| GB | 2 083 8787 | 6/1981 |

* cited by examiner

Primary Examiner—Ramon O Ramirez
(74) Attorney, Agent, or Firm—Butzel Long

(57) ABSTRACT

The present invention relates to swivel arm (21) of a ceiling-mounted stand, said arm consisting of a hollow profile and comprising an upper side (5) and a bottom side (6) arranged opposite thereto, a lateral opening (11) that corresponds to the profile cross-section and can be closed with a cover (3), an upper opening (9) in the upper side (5) that is provided for a bearing point, and a mounting opening (4) in the bottom side that is arranged opposite to the upper opening. By providing the mounting opening (4) in the bottom side (6) opposite to the opening (9) of the arm (21), insertion of a cable harness or tube package from the upper opening (9) into the arm (21) is facilitated to an essential degree.

5 Claims, 3 Drawing Sheets

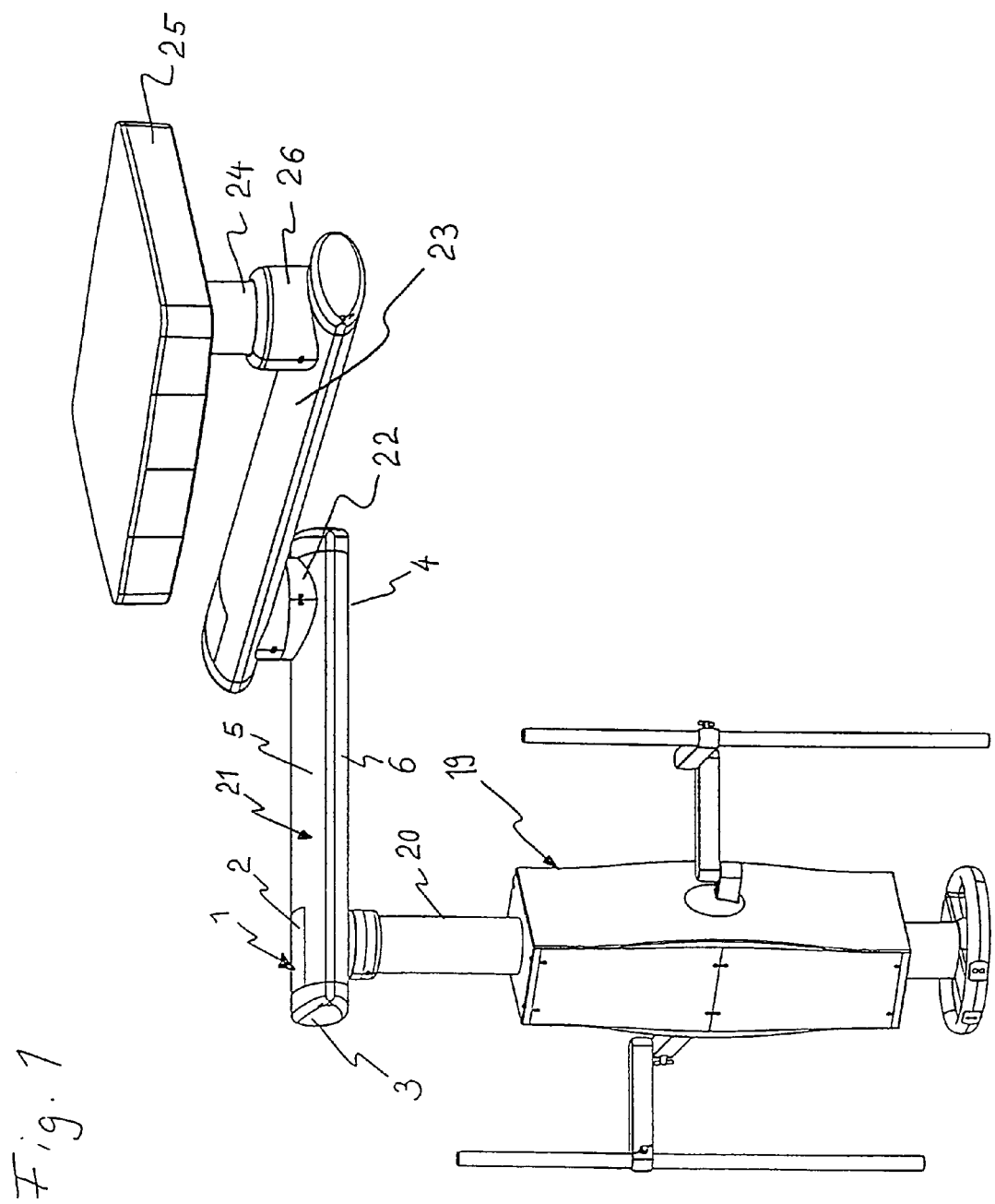

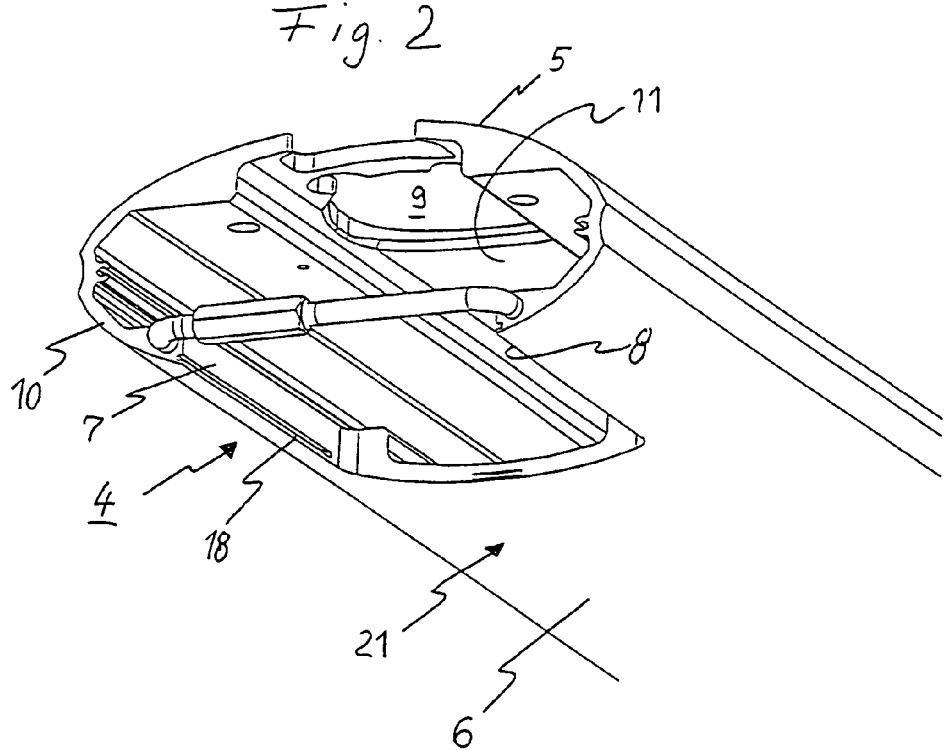
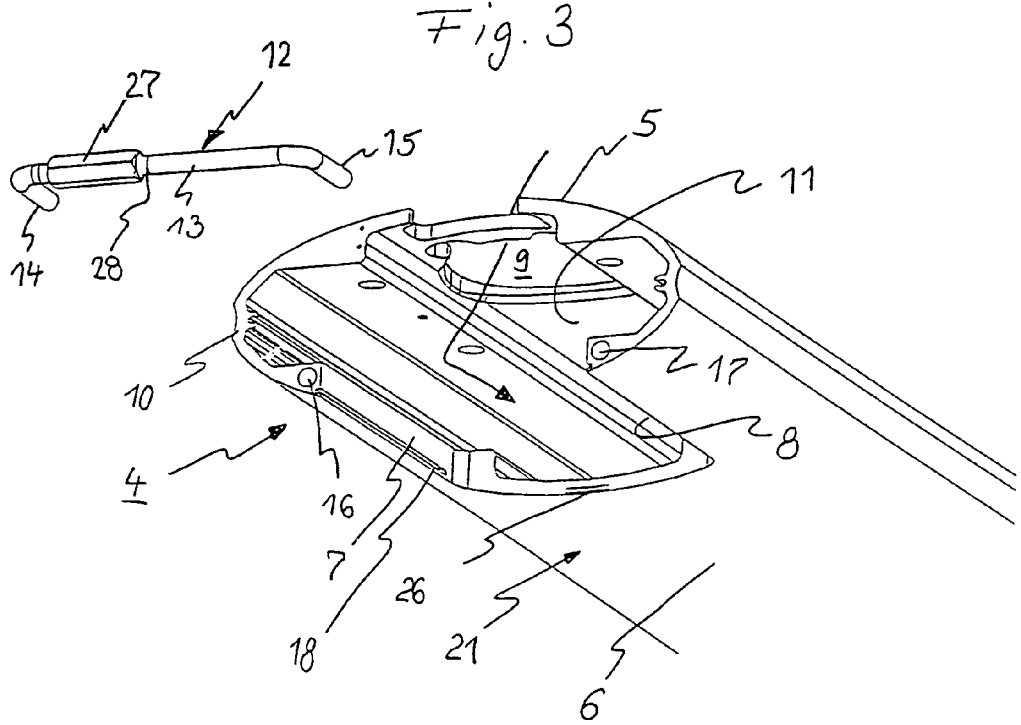

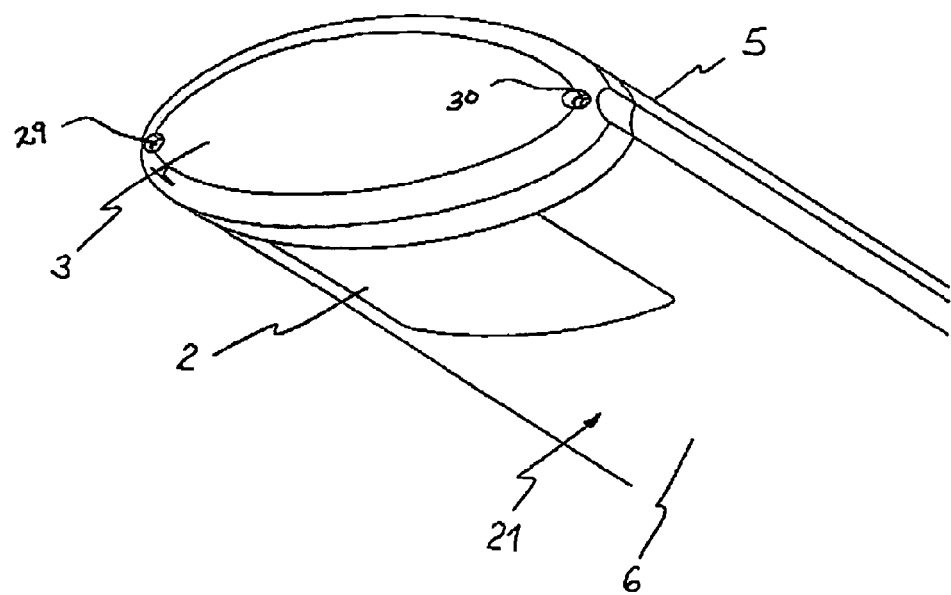

SWIVEL ARM OF A CEILING-MOUNTED STAND

The present invention relates to a swivel arm of a ceiling-mounted stand.

Ceiling-mounted medical stands are known that are provided f mounting of medical equipment, such as medical monitors, respirators, syringe pumps, etc. They are, for example, used in operating rooms or intensive-care units, etc. for accommodation of the systems required for operations, intensive care or examination of a patient.

Ceiling-mounted stands consist of at least one vertical column and one horizontal swivel arm that are mounted to the ceiling via a pivot connection such that they can be turned, and of an equipment carrier, also called stand head, that is provided to accommodate the necessary equipment. The pivotably supported arm permits the stand head to be swung across a radius desired, thus facilitating access to the patient. The stand head comprises a handle provided to swivel the stand head to a desired position.

The stand head can be attached to a vertically adjustable arm, thus providing the possibility of not only swivelling it but also of adjusting its vertical position by moving the arm with a motor. The elevating drive is actuated via an operating element or a switch. The operating element is provided in the handle.

All of the supply lines and tubes for electric current, compressed air, oxygen, and other medical gases, etc. are routed out of the ceiling and through the bearing points and placed in the column elements and the swivel arms to the stand head where they are connected to the equipment via plug connections. This prevents the necessity of placing the cables and tubes on the floor, and the risk of stumbling over cables and tubes that are lying on the floor can, thus, be eliminated.

The tubes and cables are combined to form a cable harness or tube package and are routed through the column elements, the bearing points and the swivel arm. Removable covers are attached laterally to the swivel arm. To permit routing of the cable tie harness or tube package through the connection or bearing point between a column element and a swivel arm or between two swivel arms, the lateral cover of the arm is removed so that the cable harness can be seized. Since, owing to the closed arm profile, the cable harness coming from above cannot be diverted directly in the swivel arm, the cable harness must first be pulled out of the lateral opening, then be turned by 180 degrees and subsequently be re-inserted into the lateral opening so that it can then be pushed further into the swivel arm. This mounting step, however, is very complex and time-intensive and, thus, expensive. Since the cable harness and the tube package are bent at a very small radius, there is the risk of kinking tubes or breaking sensitive cables.

Therefore, the present invention aims at providing a swivel arm that permits easier placing of the cable harness.

This problem is solved by means of a ceiling-mounted stand according to claim 1. Advantageous further developments are subject of the subordinate claims.

By providing a mounting opening in the bottom side, opposite to an opening of the arm, insertion of the cable harness or the tube package is facilitated to an essential degree.

The mounting opening is formed by a cutout in the bottom side. As a matter of course, the mounting opening can also be formed on the upper side, such as it is shown in FIG. 1.

By combining the mounting opening with the lateral opening, manual diversion of the cable harness or the tube package can be simplified to a considerable degree and in an advantageous manner.

By providing a removable bracket that is adjustable in longitudinal direction between the lateral opening and the mounting opening, any deformation of the arm or the openings can be prevented or made undone in an advantageous manner.

The invention will be illustrated in detail below by means of a presently preferred embodiment, with reference being made to the enclosed drawings, in which:

FIG. 1 is an overall view of a medical ceiling-mounted stand in perspective;

FIG. 2 is a view of a swivel arm according to the invention in perspective;

FIG. 3 is an exploded view of the swivel arm according to the invention shown in FIG. 2, in perspective; and FIG. 4 is a view of a swivel arm according to the invention in perspective.

According to FIG. 1, a ceiling-mounted stand comprises a stand head 19 that is attached to a vertical column 20. The column 20 is, in turn, attached to a horizontal swivel arm 21. The arm 21 is connected to a further horizontal swivel arm 23 in a pivoted manner and the latter is attached to a ceiling-mounted holder 25 via a pivot connection 26 and a short vertical column piece 24. The arm 21 comprises an upper side 5 and a bottom side 6. At its left-hand end section, it is provided with a mounting opening 1 that is open towards the top and is closed with a cover 2, and at its right-hand end section, it is provided with a mounting opening 4 (not visible in FIG. 1) that is open towards the bottom and can also be closed with a cover 2. Laterally, the arm 21 comprises a removable cover 3 that closes a lateral opening 11 that is, for example, shown in FIG. 2.

FIGS. 2 to 4 show the mounting opening 4 that is not visible in FIG. 1 and is positioned in the right-hand end section of the arm 21 on the bottom side 6 of the latter. The mounting opening 4 is, essentially rectangular in shape and possesses a left edge 7 and a right edge 8. Opposite to the mounting opening 4, an opening 9 for a bearing point to which the pivot connection 22 is attached is provided in the arm 21. The mounting opening 4 exceeds the opening 9 in size. In the present embodiment, the mounting opening 4 extends to a lateral outer edge 10. As a result, the mounting opening 4 is directly connected to the lateral opening 11. The opening formed by combining the lateral opening 11 with the mounting opening 4 is large enough to permit manual diversion of a cable harness or tube package (not shown) from the opening 9 of the bearing point directly into the arm 21, as indicated by an arrow in FIG. 3. Complicated manipulation of the cable or tube package (not shown), including threading out, subsequent bending by 180 degrees and threading in back into the arm 21 can, thus, be prevented.

Since the mounting opening 4 is combined with the lateral opening 11, the left edge 7 and the right edge 8 are not connected directly to each other any longer. If the arm 21 is axially loaded on the other side opposite to the mounting opening 4 and the opening 9 in longitudinal direction of the arm, the left and right edges 7, 8 are deformed. As a result, neither the cover 2 for the mounting opening 4 nor the lateral cover 3 for the lateral opening 11 fit into the particular openings.

In order to prevent this deformation, a bracket element 12 is provided that can be well recognized in particular in FIG. 3 because it is shown as a single part there. It comprises a longitudinal section 13 that possesses a rectangularly bent section 14, 15 at both of its ends. The bent sections 14, 15 are plugged in holes 16, 17 provided in the front side of the arm profile, holding the left edge 7 and the right edge 8 together.

The bracket element 12 is provided with a tensioning nut 27 that enables adjustment of the length of the elongated section 13. The function of the bracket element 12 will be illustrated in more detail below. If the arm 21 is suspended from the side opposite to the mounting opening 4 and the free end provided with the mounting opening 4 is pulled down by the dead weight of the arm, tension is applied to the bracket 12. In order to place the cable harness or tube package with the stand being under load, first the cover 2 for the mounting opening 4 and the lateral cover 3 for the lateral opening 11 are removed. Subsequently, the tensioning nut 27 is turned such that tension is relieved from the bracket 12. Then the bent ends 14 and 15 can be pulled out of the holes 16 and 17 without any difficulty, thus providing unhindered access from the combination of mounting opening 4 and lateral opening 11. Thereafter, the cable harness or tube package (not shown in the figures) can be manually inserted and routed easily.

When the bracket 12 is removed from the arm 21, the profile cross-section of the arm 21 is deformed. The spacing between the left edge 7 and the right edge 8 changes. As a result, it is not possible to remount either the cover 2 or the lateral cover 3 onto the openings without any difficulty. To facilitate mounting of the covers, the bracket 12 is, therefore, adjusted to the appropriate length by means of the tensioning nut 27, said length corresponding to the current spacing between the two holes 16 and 17. Then the bent parts 14 and 15 of the bracket 12 can be plugged into the holes 16, 17 again. Thereafter, the spacing between the left and right edges 7 and 8 is adjusted by appropriately turning the tensioning nut 27 such that both the cover 2 and the lateral cover 3 can be re-inserted in the provided openings 4 and 11 without any difficulty. Therein, the cover 2 is pushed into guide rails 18 provided to this end, with the cover being provided with plug-in edges (not shown) suitable thereto. A slot 26 is provided at the end of the mounting opening 4 in FIG. 3; a projection (not shown) of the cover 2 is also pushed into said slot 26. Finally, the lateral cover 3 is screwed to the open profile cross-section of the arm 21 by means of screws 29, 30 in order to close the lateral opening 11, as shown in FIG. 4.

FIG. 4 shows the arm 21, with the cover 2 closing the mounting opening 4 and the lateral cover 3 closing the lateral opening 11. Therein, the cover is provided with a recess on the side (not shown) pointing towards the inner side of the arm 21 to accommodate the bracket 12 therein.

What is claimed is:

1. A swivel arm of a ceiling-mounted stand made of a hollow profile and comprising an upper side and a bottom side arranged opposite thereto, a lateral opening that corresponds to a profile cross-section of the swivel arm, a cover for covering the lateral opening, an upper opening in the upper side of the swivel arm that is provided for a bearing point, and a lower mounting opening in the bottom side of the swivel arm that is arranged opposite to the upper opening, the mounting opening is defined by a cutout on the bottom side of the swivel arm, the lateral opening, upper opening and lower mounting opening each provide access to a common interior area within the swivel arm, and the mounting opening and lateral opening intersect one another and form a continuous opening.

2. The swivel arm according to claim 1, wherein the mounting opening exceeds the upper opening in size.

3. The swivel arm according to claim 1, wherein the mounting opening comprises a left lateral edge and a right lateral edge and the swivel arm further comprises a removable bracket that connects the two lateral edges to each other at the lateral opening in a direction towards the mounting opening.

4. The swivel arm according to claim 3, wherein the length of the removable bracket is adjustable.

5. The swivel arm according to claim 1, further comprising a lateral cover for covering the lateral opening.

* * * * *